Aug. 15, 1933.  F. A. HEFFERNAN  1,922,540

SEPARATOR FOR ANTIFRICTION BEARINGS

Filed Jan. 30, 1930

INVENTOR:
FRANK A. HEFFERNAN,
BY
HIS ATTORNEY.

Patented Aug. 15, 1933

1,922,540

UNITED STATES PATENT OFFICE 1,922,540

SEPARATOR FOR ANTIFRICTION BEARINGS

Frank A. Heffernan, Bristol, Conn., assignor to The New Departure Manufacturing Company, Bristol, Conn., a Corporation of Connecticut Application January 30, 1930. Serial No. 424,564

11 Claims. (Cl. 308—201)

This invention relates to separators for antifriction bearings and comprises all the features of novelty herein disclosed. An object of the invention is to provide an improved separator wherein the sections are reliably locked together against relative twisting or weaving. Another object is to provide an improved two-piece separator which can be easily and accurately formed with small waste of material and be light and strong withal. To these ends, the invention further consists in the various matters hereinafter described and claimed. In its broader aspects, the invention is not necessarily limited to the specific construction selected for illustrative purposes in the accompanying drawing in which.

Figure 1:
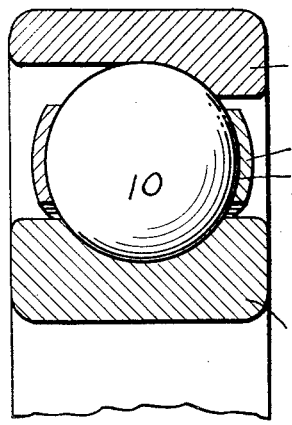
Fig. 1 is a cross sectional view of a portion of a ball bearing having the improved separator.

In the illustrative example, the separator not only separates the rolling elements but functions also as a cage to retain the rolling elements which are shown as a row of balls 10 running on grooved raceways of an inner race ring 12 and an outer race ring 14. The separator comprises spaced rings 16 of wavy form to provide ball pockets 18 and flattened portions 20 located part way in between adjacent balls. The rings are united by flat stakes 22 comprising a body portion having shoulders 24, and square-cornered studs or extensions 26 which pass through square-cornered openings 28 in the rings and are upset as indicated at 30 to form retaining heads. The corners of the body portion are rounded to merge with the shoulders which act to space the rings apart by engagement with the flattened portions 20 of the rings.

Figure 5:
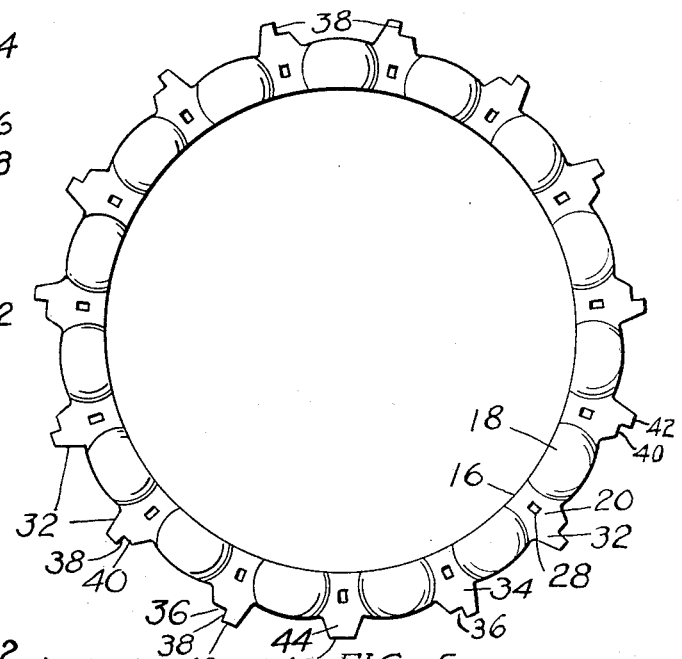
Fig. 5 is a smaller scale view of one of the blanks.
Figure 2:
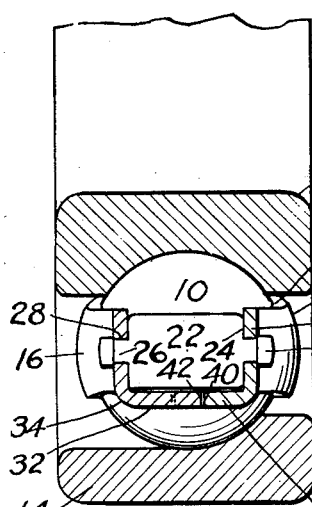
Fig. 2 is a similar view, the section of the separator being taken between two adjacent balls and at one side of the separator stake.
Figure 6:
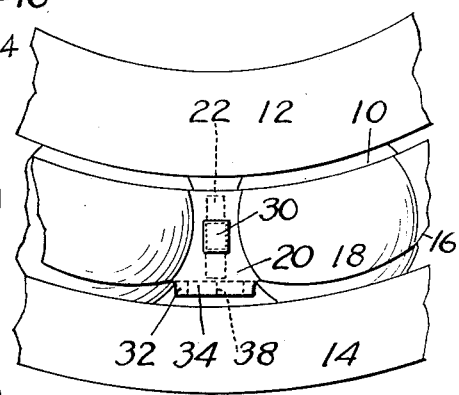
Fig. 6 is a side view of a portion of the bearing.
Figure 3:
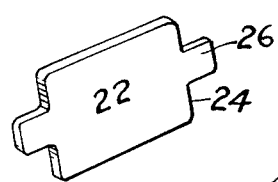
Fig. 3 is a perspective view of a stake.
Figure 4:
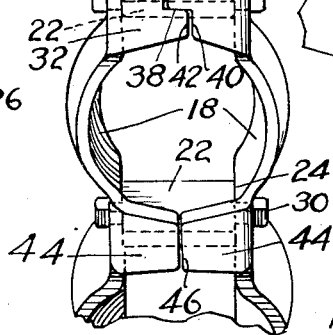
Fig. 4 is an outside view of a portion of the separator.

One of the ring blanks is illustrated in Fig. 5. As stamped out of sheet metal, one edge, preferably the outer one, has a plurality of radially extending and tapering fingers 32 which are afterwards bent on an arc in the region 34 to extend in between the balls and to overlie the stakes 22. Each finger is notched or halved at 36 to provide a shoulder or side edge 38 which will extend directly crosswise or axially of the bearing. The cut-out half of each finger terminates in an edge 40 and the extended portion of each finger terminates in an edge 42. The fingers of one ring mate with those of the other, the shoulders 38 engaging one another across the middle plane of the row of balls and so effectively locking the rings against relative twisting or weaving. The rings are preferably exactly alike, each having the shoulders or edges 38 facing alternately right and left circumferentially of the ring so that adjacent right and left extensions of one ring can be made to fit between a left and a right extension of the other ring, thereby bracing the separator and further insuring against twisting or weaving in either direction. The edge 40 of one finger is slightly spaced from the edge 42 of the mating finger, it being advisable to control the spacing of the rings entirely by the stakes. When there is an even number of balls, the fingers can have their right and left facing shoulders arranged alternately all the way around the ring. In the case of an odd number of balls, however, one finger 44 on each ring is preferably left plain, its edge 46 to clear a similar edge on the mating finger of the other ring. Directly opposite to the plain finger, there will be two fingers with their shoulders 38 facing the same way as indicated at the top of Fig. 5 but otherwise the direction of facing will alternate left and right.

I claim:

1. In a separator for a row of rolling elements, a pair of rings having co-operating pockets for the rolling elements and flattened portions between adjacent rolling elements, stakes spacing the flattened portions and uniting the rings, and means for locking the rings against relative twisting comprising mating fingers bent in over the stakes from adjacent edges of the rings, the mating fingers having notches forming side shoulders which face in opposite directions and engage one another across the central plane of the row of rolling elements, right and left facing shoulders on one ring fitting between left and right facing shoulders on the other ring; substantially as described.

2. In a separator for a row of rolling elements, a pair of rings having co-operating pockets for the rolling elements and flattened portions between adjacent rolling elements, stakes spacing the flattened portions and uniting the rings, and means for locking the rings against relative twisting comprising mating fingers bent in over the stakes from adjacent edges of the rings, the mating fingers having notches forming side shoulders which face in opposite directions and engage one another across the central plane of the row of rolling elements; substantially as described.

3. In a separator for a row of rolling elements, a pair of rings having co-operating pockets for the rolling elements and flattened portions between adjacent rolling elements, stakes spacing the flattened portions and uniting the rings, and means for locking the rings against relative twisting comprising mating fingers bent in over the stakes from the rings and having side edges which engage one another; substantially as described.

4. In a separator for a row of rolling elements, a pair of rings having co-operating pockets for the rolling elements and flattened portions between adjacent rolling elements, stakes spacing the flattened portions and uniting the rings, and means for locking the rings against relative twisting comprising mating fingers bent in over the stakes from the rings and having side edges which engage one another, the side edges on a pair of adjacent fingers of one ring fitting between the side edges on a pair of adjacent fingers of the other ring; substantially as described.

5. In a separator for a row of rolling elements, a pair of spaced rings, means for uniting the rings, and means for locking the rings against relative twisting comprising mating fingers extending inwardly from the adjacent edges of the rings, the mating fingers having axially extending side edges which face in opposite directions circumferentially of the rings and engage one another crosswise of the central plane of the row of rolling elements; substantially as described.

6. In a separator for a row of rolling elements, a pair of spaced rings, means for uniting the rings, and means for locking the rings against relative twisting comprising mating fingers extending inwardly from the adjacent edges of the rings, the mating fingers having side edges which face in opposite directions circumferentially of the rings and engage one another crosswise of the central plane of the row of rolling elements; the side edges on an adjacent pair of fingers of one ring fitting between the side edges on a pair of fingers of the other ring; substantially as described.

7. In a separator for a row of rolling elements, a pair of spaced rings, means for uniting the rings, and means for locking the rings against relative twisting comprising mating fingers extending inwardly from the rings, the mating fingers having notches forming side shoulders which face in opposite directions circumferentially of the rings and engage one another crosswise of the central plane of the row of rolling elements, right and left facing shoulders on one ring fitting between left and right facing shoulders on the other ring; substantially as described.

8. In a separator for a row of rolling elements, a pair of spaced rings, means for uniting the rings, and means for locking the rings against relative twisting comprising mating fingers extending inwardly from the rings, the mating fingers having notches forming side shoulders which face in opposite directions circumferentially of the rings and engage one another crosswise of the central plane of the row of rolling elements; substantially as described.

9. In a separator for a row of rolling elements, a pair of spaced rings having pockets for the rolling elements, means for uniting the rings, and means for locking the rings against relative twisting comprising mating fingers on the rings, the fingers having axially extending side edges which engage one another crosswise of the central plane of the row of rolling elements; substantially as described.

10. In a separator for a row of rolling elements, a pair of spaced rings, means comprising stakes for connecting said spaced rings and holding them against axial separation or approach, and means for positively interlocking the rings circumferentially at the central plane of the row of rolling elements to prevent relative rotary movement of the rings in either direction; substantially as described.

11. In a separator for a row of rolling elements, a pair of spaced rings, means for connecting said rings and holding them against axial separation or approach, and means for locking the rings against relative twisting comprising mating fingers extending towards each other from adjacent portions of the rings, the fingers on both rings being at the same distance from the center of the rings and having edge to edge contact crosswise of the separator; substantially as described.

FRANK A. HEFFERNAN.